(12) United States Patent
Ochi

(10) Patent No.: US 9,759,985 B2
(45) Date of Patent: Sep. 12, 2017

(54) LENS BARREL AND OPTICAL APPARATUS

(71) Applicant: CANON KABUSHIKI KAISHA, Tokyo (JP)

(72) Inventor: Daisuke Ochi, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/969,299

(22) Filed: Dec. 15, 2015

(65) Prior Publication Data
US 2016/0178989 A1 Jun. 23, 2016

(30) Foreign Application Priority Data

Dec. 17, 2014 (JP) ................................ 2014-254692

(51) Int. Cl.
*G03B 9/06* (2006.01)
*G02B 7/10* (2006.01)
*G03B 17/14* (2006.01)

(52) U.S. Cl.
CPC .................. *G03B 9/06* (2013.01); *G02B 7/10* (2013.01); *G02B 7/102* (2013.01); *G03B 17/14* (2013.01); *G03B 2205/0046* (2013.01)

(58) Field of Classification Search
CPC ..................................... G03B 9/06; G02B 7/10
See application file for complete search history.

(56) References Cited

U.S. PATENT DOCUMENTS

2002/0093745 A1* 7/2002 Takanashi .......... H04N 5/23296
 359/696
2014/0198393 A1* 7/2014 Sugita .................. G02B 15/177
 359/680

FOREIGN PATENT DOCUMENTS

JP      9222628 A    8/1997
JP   2001083565 A    3/2001

\* cited by examiner

*Primary Examiner* — W B Perkey
(74) *Attorney, Agent, or Firm* — Rossi, Kimms & McDowell LLP

(57) ABSTRACT

The lens barrel includes a main aperture stop, a first sub aperture stop including a first stop blade and a first driving member rotatable about an optical axis to drive the first stop blade in its open and close direction, a second sub aperture stop including a second stop blade and a second driving member rotatable about the optical axis to drive the second stop blade in its open and close direction, and a cam barrel including a first cam portion engaging with a first engagement portion provided to the first driving member and a second cam portion engaging with a second engagement portion provided to the second driving member. The cam barrel is rotatable about the optical axis to rotate the first and second driving members.

14 Claims, 4 Drawing Sheets

LENS BARREL AND OPTICAL APPARATUS

BACKGROUND OF THE INVENTION

Field of the Invention

The present invention relates to an optical apparatus, such as an interchangeable lens and an image capturing apparatus, which includes a lens barrel provided with a main aperture stop and a sub aperture stop.

Description of the Related Art

Aperture stops provided to a lens barrel change a stop aperture formed by multiple stop blades by moving the multiple stop blades in an open and close direction to control a light amount. The lens barrel includes ones provided with a main aperture stop that mainly controls the light amount and a sub aperture stop to correct a diameter of a fully-opened stop aperture (hereinafter referred to as "a fully-opened stop aperture diameter") set by the main aperture stop depending on a focal length and an object distance or to prevent a significant change in a marginal light amount caused by a zoom operation.

Japanese Patent Laid-Open No. 2001-83565 discloses a lens barrel provided with a sub aperture stop that corrects the fully-opened stop aperture diameter in response to a focusing operation. On the other hand, Japanese Patent Laid-Open No. 9-222628 discloses a lens barrel that changes, in response to a zoom operation, a distance in an optical axis direction between a main aperture stop and a sub aperture stop disposed on an image side further than the main aperture stop to perform flare cutting by the sub aperture stop so as to prevent a significant change in a marginal light amount caused by the zoom operation.

Typical aperture stops each drive the stop blades in the open and close direction by using an actuator. The lens barrel disclosed in Japanese Patent Laid-Open No. 2001-83565 drives the stop blades in the main aperture stop by the actuator and, however, drives the stop blades in the sub aperture stop without using the actuator. In this disclosed lens barrel, a rotating member that drives the stop blades in the sub aperture stop has a cam portion extending in the optical axis direction, and the cam portion has a cam groove portion with which a cam follower provided to a movable lens engages. When the movable lens is moved in the optical axis direction, the rotating member is rotated about the optical axis by a lift of the cam groove portion, which drives the stop blades.

Lens barrels whose lenses have special optical characteristics such as an ultra-wide-angle lens require, in addition to the main aperture stop, at least two sub aperture stops, namely, one sub aperture stop correcting the fully-opened stop aperture diameter and another sub aperture stop performing the flare cutting so as to prevent the significant change in the marginal light amount. These lens barrels each require a configuration that enables separately adjusting diameters of stop apertures of the two sub aperture stops while suppressing an increase in cost and in number of parts. Moreover, in these lens barrels, the sub aperture stops may have mutually different fully-opened stop aperture diameters.

However, prior art documents including Japanese Patent Laid-Open Nos. 2001-83565 and 9-222628 fail to disclose such a lens barrel provided not only with the main aperture stop, but also with two or more sub aperture stops.

SUMMARY OF THE INVENTION

The present invention provides a lens barrel including a main aperture stop and at least two sub aperture stops and being capable of separately adjusting diameters of the sub aperture stops while suppressing an increase in number of parts and in cost.

The present invention provides as an aspect thereof a lens barrel including a main aperture stop, a first sub aperture stop including a first stop blade and a first driving member rotatable about an optical axis to drive the first stop blade in its open and close direction, a second sub aperture stop including a second stop blade and a second driving member rotatable about the optical axis to drive the second stop blade in its open and close direction, and a cam barrel including a first cam portion engaging with a first engagement portion provided to the first driving member and a second cam portion engaging with a second engagement portion provided to the second driving member. The cam barrel is rotatable about the optical axis to rotate the first and second driving members.

The present invention provides as another aspect thereof an optical apparatus including the above lens barrel.

Further features and aspects of the present invention will become apparent from the following description of exemplary embodiments with reference to the attached drawings.

DESCRIPTION OF THE EMBODIMENTS

Exemplary embodiments of the present invention will be described below with reference to the attached drawings.

Embodiment 1

Figure 1:
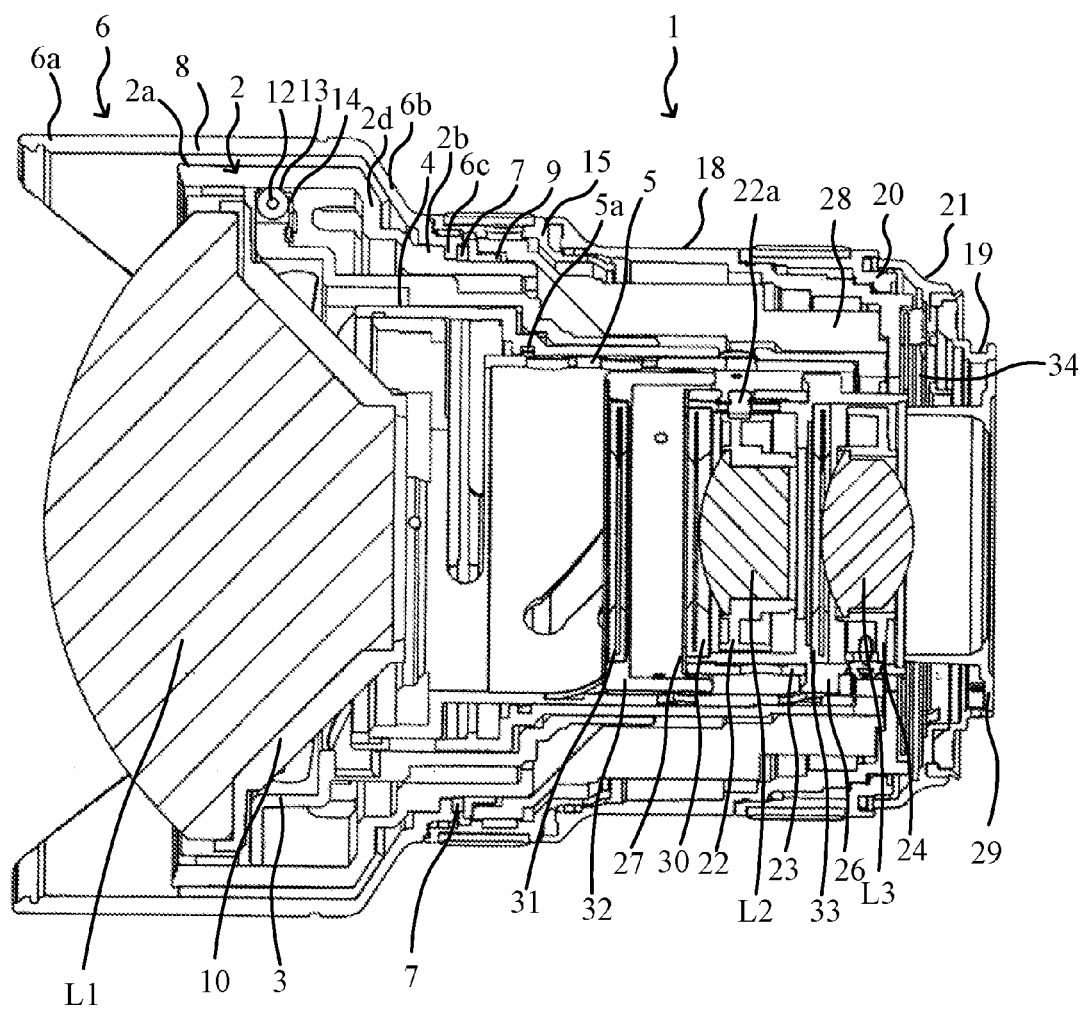
FIG. 1 is a sectional view of a lens barrel that is Embodiment 1 of the present invention.

FIG. 1 illustrates a configuration of an interchangeable lens as an optical apparatus including a lens barrel that is an embodiment of the present invention.

An interchangeable lens 1 is detachably attached to a camera body (not illustrated) (single-reflex camera or a mirror-less camera). The interchangeable lens 1 includes the lens barrel and a mount 19 provided at a rear end (image side end) of the lens barrel and coupled to the camera body.

The lens barrel holds an image capturing optical system including, in order from an object side (left side of the drawing; hereinafter referred to also as "a front side") to an image side (right side of the drawing; hereinafter referred to as "a rear side"), first to third lens units L1 to L3. The first to third lens units L1 to L3 are moved in an optical axis direction of the image capturing optical system to perform variation of magnification. On the other hand, the second lens unit L2 is moved in the optical axis direction to perform focusing. The interchangeable lens 1 of this embodiment is a so-called ultra wide-angle lens and includes the first lens unit L1 having a far larger outer diameter compared with the lens units L2 and L3. In the following description, a direction orthogonal to the optical axis of the image capturing optical system is referred to also as "a radial direction", and a direction about the optical axis is referred to also as "a circumferential direction".

The mount 19 is screw-fixed to a base barrel 18 together with a flange back adjusting ring 21. A guide barrel 4 is screw-fixed to the base barrel 18. In an inner circumference of the guide barrel 4, a cam barrel 5 is disposed whose bayonet portion 5a enables rotation thereof about the optical axis of the image capturing optical system.

A linearly movable barrel 3 is disposed between the guide barrel 4 and the base barrel 18. The first lens unit L1 is held by a first unit holding frame 10, and the first unit holding frame 10 is screw-fixed to the linearly movable barrel 3. A linearly movable cam follower (not illustrated) is screw-fixed to the linearly movable barrel 3.

An adjustment barrel (lens housing barrel) 2 includes a first barrel portion 2a that houses, on its inner circumference side, the linearly movable barrel 3 and the first unit holding frame 10 (first lens unit L1) and a second barrel portion 2b that is provided on a rear side further than the first barrel portion 2a and whose outer diameter is smaller than that of the first barrel portion 2a. The adjustment barrel 2 includes, between the first and second barrel portions 2a and 2b, a connecting portion 2d that connects the first and second barrel portions 2a and 2b to each other and whose outer diameter reduces from the first barrel portion 2a to the second barrel portion 2b. The second barrel portion 2b is screw-fixed, in its inner circumference, to the guide barrel 4.

The adjustment barrel 2 is capable of adjustment of its eccentricity in the radial direction with respect to the guide barrel 4. Adjusting the eccentricity enables performing adjustment for making optical axes of the first to third lens units L1 to L3. coincide with one another.

The linearly movable barrel 3 has groove portions formed at three locations in the circumferential direction in a flange portion formed at a front end of the linearly movable barrel 3. In each of the three groove portions, a roller 13 that contacts an inner circumferential surface of the adjustment barrel 2 rollably in the optical axis direction and a roller shaft 12 that rotatably holds the roller 13 are disposed. The roller shaft 12 is held by a roller shaft fixer (folded sheet metal) 14 screw-fixed to the linearly movable barrel 3. The roller 13 is always pressed against the inner circumferential surface of the adjustment barrel 2 by a roller shaft biasing spring (not illustrated) that biases the roller shaft 12 toward the radially outer side.

In an inner circumference of the cam barrel 5, a focus cam barrel 23 is disposed. In the focus cam barrel 23, a focus cam groove portion is formed. The second lens unit L2 is held by a second unit holding frame 22 provided with a cam follower 22a engaging with the focus cam groove portion of the focus cam barrel 23.

The second unit holding frame 22 and the third unit holding frame 24 are held by a rear unit holding frame 26. A focus cam barrel retainer (folded sheet metal) 27 is fixed to a front end of the rear unit holding frame 26. The focus cam barrel 23 is sandwiched and held rotatably about the optical axis by the focus cam barrel retainer 27 and a middle surface of the rear unit holding frame 26, the middle surface being located at a middle part in the optical axis direction. The rear unit holding frame 26 is provided with a linearly movable cam follower (not illustrated).

In the guide barrel 4, a straight groove portion (not illustrated) is formed so as to extend in the optical axis direction. Similarly, in the cam barrel 5, a rear unit cam groove portion (not illustrated) and a linearly movable barrel cam groove portion are formed. The linearly movable cam followers provided to the rear unit holding frame 26 and the linearly movable barrel 3 both engage with the straight groove portion and respectively engage with the rear unit cam groove portion and the linearly movable barrel cam groove portion. With this configuration, when the cam barrel 5 is rotated, the rear unit holding frame 26 (i.e., the second and third lens units L2 and L3) and the linearly movable barrel 3 (i.e., the first lens unit L1) are linearly moved in the optical axis direction by lifts of the rear unit cam groove portion and the linearly movable barrel cam groove portion, respectively. Thereby, a zooming operation (variation of magnification) is performed.

A main aperture stop unit 30 is an electromagnetic aperture stop unit that performs light amount control to set an F-number of the image capturing optical system. The main aperture stop unit 30 is disposed inside the focus cam barrel 23 and between the focus cam barrel retainer 27 fixed to the rear unit holding frame 26 as described above and the second unit holding frame 22. The main aperture stop unit 30 is screw-fixed to the rear unit holding frame 26.

The first sub aperture stop unit 31 is disposed on a front side further than the main aperture stop unit 30 and corrects a fully-opened stop aperture diameter of the main aperture stop unit 30 in response to the zoom operation. The first sub aperture stop unit 31 is screw-fixed to the sub aperture stop holding barrel 32. The sub aperture stop holding barrel 32 includes cam followers (not illustrated) engaging with sub aperture stop holding cam groove portions (not illustrated) provided in the cam barrel 5. With this structure, the rotation of the cam barrel 5 changes a distance in the optical axis direction between the sub aperture stop holding barrel 32, that is, the first sub aperture stop unit 31 and the main aperture stop unit 30.

The second sub aperture stop unit 33 is disposed on a rear side further than the main aperture stop unit 30 and performs flare cutting to prevent a significant change in a marginal light amount caused by the zoom operation. The second sub aperture stop unit 33 is screw-fixed to the rear unit holding frame 26.

A focus unit 28 is screw-fixed to the guide barrel 4. A manual ring 15 as a focus operation member is held rotatably about the optical axis with respect to the focus unit 28 at a fixed position in the optical axis direction. The focus unit 28 is constituted by a vibration-type motor and a differential mechanism. The focus unit 28 outputs, to a focus key (not illustrated), a rotation amount corresponding to a rotation amount of the vibration-type motor and a rotation amount of the manual ring 15. The focus key engages with a focus key engagement groove portion formed in the focus cam barrel 23. With this configuration, the focus cam barrel 23 is rotated by a driving force from the vibration-type motor in autofocus and is rotated by a force caused by a rotation operation of the manual ring 15 by a user in manual focusing. Consequently, the second unit holding frame 22 is moved in the optical axis direction together with the second lens unit L2 by a lift of the focus cam groove portion of the focus cam barrel 23 to perform focusing.

A zoom ring 20 is a zoom operation member for which a rotation operation is to be performed by the user and that is held by the base barrel 18 rotatably about the optical axis at a fixed position in the optical axis direction. A zoom key (not illustrated) is screw-fixed to the zoom ring 20. The zoom key engages with a zoom key engagement groove portion formed in the cam barrel 5. With this configuration, the rotation operation of the zoom ring 20 provides a rotation operation force to rotate the cam barrel 5. The rotation of the cam barrel 5 linearly moves the rear unit holding frame 26 (i.e., the second and third lens units L2 and L3) and the linearly movable barrel 3 (i.e., the first lens unit L1) in the optical axis direction. Thereby, the zoom operation is performed. Reference numeral 6 denotes a lens hood as an external barrel. The lens hood 6 has a hood portion 6a disposed at an outer circumference of the first barrel portion 2a of the adjustment barrel 2 and a conical barrel portion (extending portion) 6b extending from the hood portion 6a, with its diameter reducing from that of the hood portion 6a, via an outer circumference of a connecting portion 2d of the adjustment barrel 2 to the outer circumference of the second barrel portion 2b. The hood portion 6a has a front end protruding further forward than the adjustment barrel 2 (first barrel portion 2a) and a front side lens surface of the first lens unit L1. In an inner circumferential portion of the conical barrel portion 6b, a washer receiving portion 6c is formed. Between a rear end surface of the washer receiving portion 6c and a front end surface of a fixed ring member (receiving portion) 9 screw-fixed to an outer circumferential surface of the second barrel portion 2b of the adjustment barrel 2, a wave washer 7 that is a first elastic member is disposed in a state of being slightly compressed (elastically deformed) in the optical axis direction.

Furthermore, between an inner circumferential surface of the lens hood 6 and an outer circumferential surface of the adjustment barrel 2 (the first barrel portion 2a and the connecting portion 2d), a rubber barrel 8 that is a second elastic member is disposed.

A back lid 29 is snap-joined to the mount 19 and cuts off unwanted light. A main substrate 34 is electrically connected to the focus unit 28 and the main aperture stop unit 30 and controls these focus unit 28 and main aperture stop unit 30.

Figure 2:
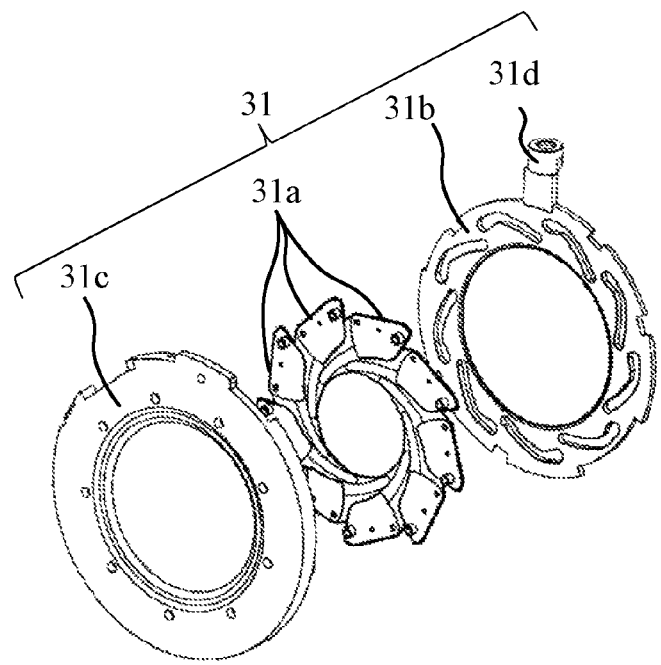
FIG. 2 is an exploded perspective view of a first sub aperture stop unit included in the lens barrel of Embodiment 1.

Next, with reference to FIGS. 2 and 3, description will be made of configurations of the first and second sub aperture stop units 31 and 33. As illustrated in FIG. 2, the first sub aperture stop unit 31 includes multiple first stop blades 31a and a first rotating member (first driving member) 31b that rotates about the optical axis to drive the multiple first stop blades 31a in their open and close direction. The first sub aperture stop unit 31 further includes a first base member 31c that holds the multiple first stop blades 31a movably in the open and close direction and holds the first rotating member 31b rotatably. The first rotating member 31b has multiple blade driving cam groove portions to drive the multiple first stop blades 31a in the open and close direction. The first rotating member 31b is provided with a first engagement portion 31d extending toward a radially outer side. The first engagement portion 31d engages with a first sub aperture stop cam groove portion (first cam portion) formed in the cam barrel 5, which will be described later. With this configuration, the rotation of the cam barrel 5 in response to the zoom operation rotates the first rotating member 31b via the first engagement portion 31d engaging with the first sub aperture stop cam groove portion, which drives the multiple first stop blades 31a in the open and close direction. Consequently, a diameter of a stop aperture formed by the multiple first stop blades 31a in the first sub aperture stop unit 31 (the diameter is hereinafter referred to as "a first stop aperture diameter") is changed.

Figure 3:
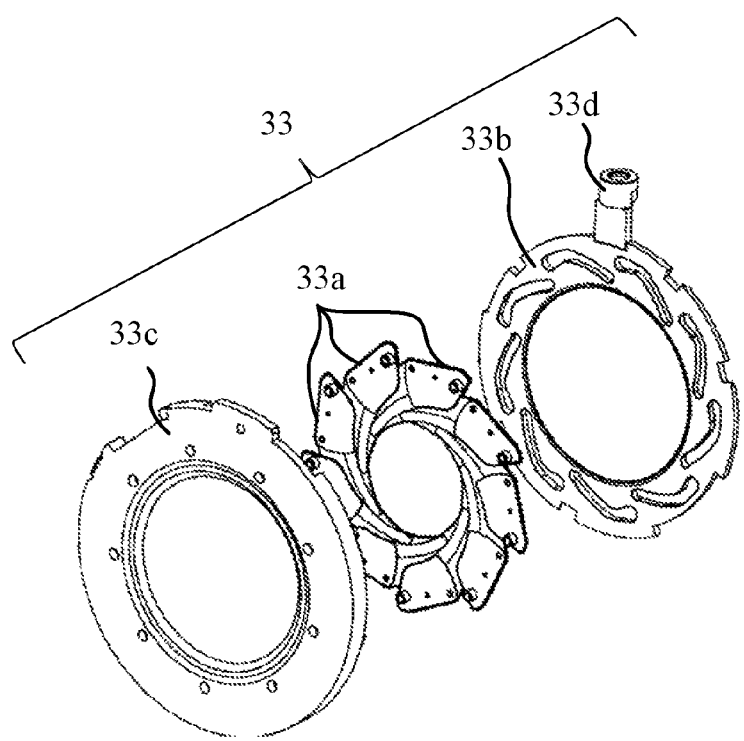
FIG. 3 is an exploded perspective view of a second sub aperture stop unit included in the lens barrel of Embodiment 1.

As illustrated in FIG. 3, the second sub aperture stop unit 33 includes multiple second stop blades 33a and a second rotating member (second driving member) 33b that rotates about the optical axis to drive the multiple second stop blades 33a in their open and close direction. The second sub aperture stop unit 33 further includes a second base member 33c that holds the multiple second stop blades 33a movably in the open and close direction and holds the second rotating member 33b rotatably. The second rotating member 33b has multiple blade driving cam groove portions to drive the multiple second stop blades 33a in the open and close direction. The second rotating member 33b is provided with a second engagement portion 33d extending toward a radially outer side. The second engagement portion 33d engages with a second sub aperture stop cam groove portion (second cam portion) formed in the cam barrel 5, which will be described later. With this configuration, the rotation of the cam barrel 5 in response to the zoom operation rotates the second rotating member 33b via the second engagement portion 33d engaging with the second sub aperture stop cam groove portion, which drives the multiple second stop blades 33a in the open and close direction. Consequently, a diameter of a stop aperture formed by the multiple second stop blades 33a in the second sub aperture stop unit 33 (the diameter is hereinafter referred to as "a second stop aperture diameter") is changed.

In this embodiment, the first and second sub aperture stop units 31 and 33 are constituted by using mutually identical members. That is, the first and second stop blades 31a and 33a, the first rotating member 31b including the first engagement portion 31d and the second rotating member 33b including the second engagement portion 33d, and the first and second base members 31c and 33c are respectively mutually identical members (that is, mutually common parts).

Figure 4:
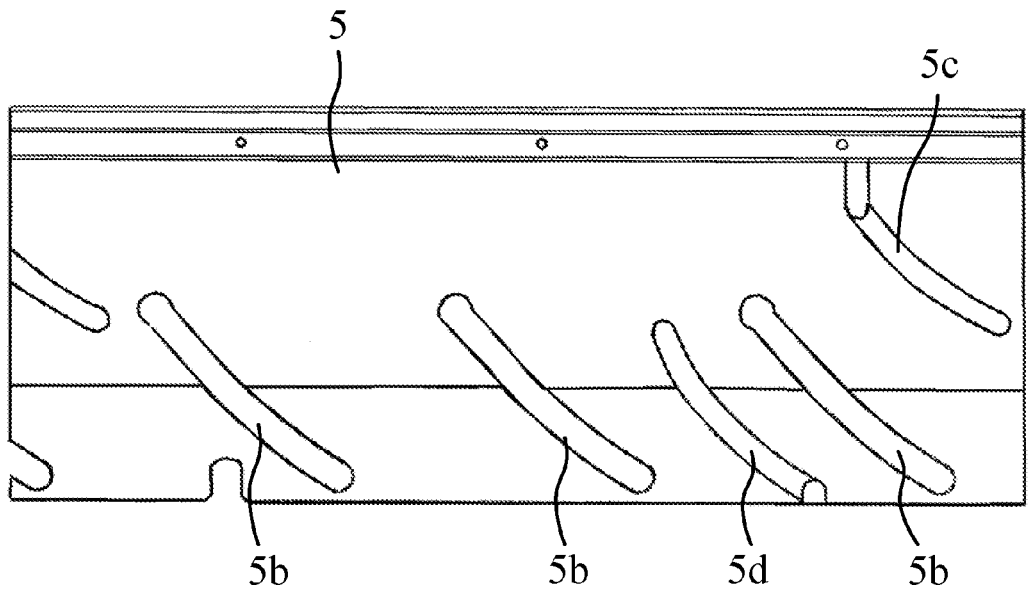
FIG. 4 is a development view of a cam barrel in Embodiment 1.

Next, with reference to FIGS. 4 and 5, description will be made of a relation between the cam barrel 5 and each of the first and second sub aperture stop units 31 and 33. FIG. 4 illustrates the cam barrel 5 developed in its circumferential direction. The cam barrel 5 has three rear unit cam groove portions (described above) 5b with which three linearly movable cam followers (described above) provided to the rear unit holding frame 26 engage. In addition, the cam barrel 5 has the above-described first sub aperture stop cam groove portion (first cam portion) 5c with which the first engagement portion 31d of the first sub aperture stop unit 31 engages and the above-described second sub aperture stop cam groove portion (second cam portion) 5d with which the second engagement portion 33d of the second sub aperture stop unit 33 engages. With this configuration, the rotation of the cam barrel 5 in response to the zoom operation rotates, as described above, the first and second rotating members 31b and 33b via the first and second engagement portions 31d and 33d respectively engaging with the first and second sub aperture stop cam groove portions 5c and 5d. Consequently, the first and second stop aperture diameters of the first and second sub aperture stop units 31 and 33 are changed.

In this embodiment, cam shapes (cam curves) of the first and second sub aperture stop cam groove portions 5c and 5d are mutually different, in other words, cam lift amounts of the first and second sub aperture stop cam groove portions 5c and 5d at each rotation position of the cam barrel 5 are mutually different. This enables separately (independently) controlling the stop aperture diameters of the first and second sub aperture stop units 31 and 33, which will be described with reference to FIG. 5.

Figure 5:
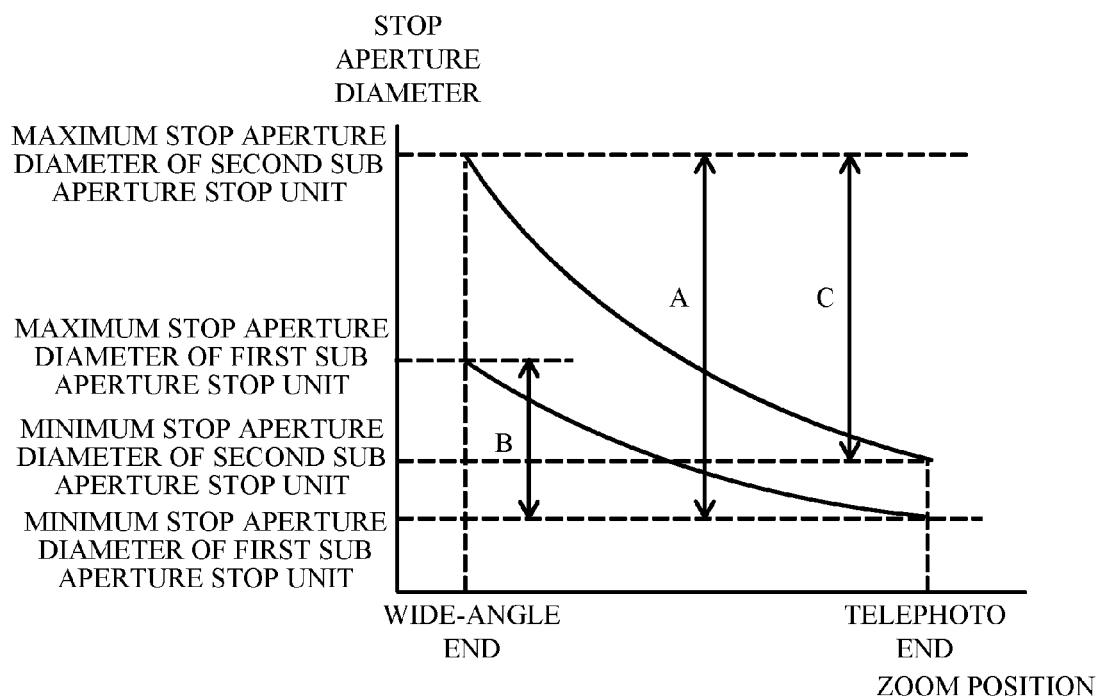
FIG. 5 illustrates a relation between zoom positions and diameters of the stop apertures in Embodiment 1.

A graph of FIG. 5 shows a relation between a zoom position (focal length) and the first and second stop aperture diameters of the first and second sub aperture stop units 31 and 33. A horizontal axis indicates a zoom position from a wide-angle end to a telephoto end, namely, the rotation position of the cam barrel 5, and a vertical axis indicates the stop aperture diameter. A range A indicates a changeable range of a total stop aperture diameter acquired by changing the first and second stop aperture diameters of the first and second sub aperture stop units 31 and 33 from their minimum diameters to their maximum diameters. A range B indicates a changeable range of the first stop aperture diameter of the first sub aperture stop unit 31 from its minimum diameter to its maximum diameter. A range C indicates a changeable range of the second stop aperture diameter of the second sub aperture stop unit 33 from its minimum diameter to its maximum diameter.

As can be understood from FIG. 5, each of the first and second sub aperture stop units 31 and 33 constituted only by mutually common parts is originally capable of changing its stop aperture diameter within the range A. However, when their stop aperture diameters are respectively controlled by the first and second sub aperture stop cam groove portions 5c and 5d of the cam barrel 5, that is, when the first and second sub aperture stop units 31 and 33 are included in the lens barrel, the first stop aperture diameter of the first sub aperture stop unit 31 is controlled within the range B, and the second stop aperture diameter of the second sub aperture stop unit 33 is controlled within the range C. In addition, the first and second stop aperture diameters of the first and second sub aperture stop units 31 and 33 at each zoom position are mutually different. In other words, the first and second sub aperture stop cam groove portions 5c and 5d rotate the first and second rotating members 31b and 33b to mutually different rotation positions with respect to a same rotation position of the cam barrel 5.

Although FIG. 5 illustrates the first sub aperture stop unit 31 (included in the lens barrel) whose stop aperture diameter is decreased to the minimum stop aperture diameter of the range A, this is a mere example for description purpose and thus the stop aperture diameter thereof may be decreased only to that larger than the minimum stop aperture diameter. Similarly, although FIG. 5 illustrates the second sub aperture stop unit 33 (included in the lens barrel) whose stop aperture diameter is increased to the maximum stop aperture diameter of the range A, this is a mere example for description purpose and thus the stop aperture diameter thereof may be increased only to that smaller than the maximum stop aperture diameter.

Embodiment 2

Although Embodiment 1 described the case where the first and second sub aperture stop cam groove portions 5c and 5d are separately formed in the cam barrel 5 as illustrated in FIG. 4, these first and second sub aperture stop cam groove portions 5c and 5d may be formed as a single continuous cam groove portion (single continuous cam portion).

Figure 6:
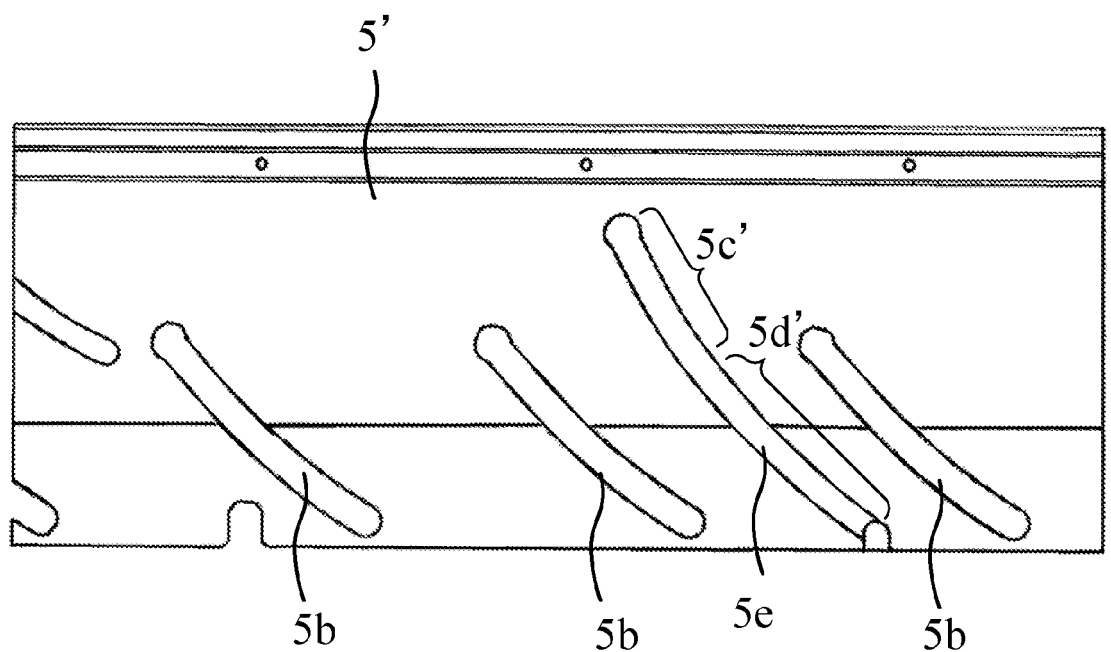
FIG. 6 is a development view of a cam barrel in the lens barrel that is Embodiment 1 of the present invention.

FIG. 6 illustrates a cam barrel 5' in a second embodiment (Embodiment 2) of the present invention developed in its circumferential direction. A configuration of the entire lens barrel 1 and configurations of the first and second sub aperture stop units 31 and 33 are the same as those in Embodiment 1 (FIGS. 1 to 3).

Also in this embodiment, the cam barrel 5' has the three rear unit cam groove portions 5b with which the three linearly movable cam followers provided to the rear unit holding frame 26 engage. On the other hand, the cam barrel 5' has a sub aperture stop cam groove portion 5e, as a single continuous cam groove portion, in which a cam area 5c' corresponding to the first sub aperture stop cam groove portion 5c and a cam area 5d' corresponding to the second sub aperture stop cam groove portion 5d both illustrated in FIG. 4 are formed in mutually different areas in the optical axis direction.

In this embodiment, as illustrated in FIG. 1, the first and second sub aperture stop units 31 and 33 are moved in the optical axis direction within mutually different zones (zones opposite to each other with respect to the main aperture stop unit 30) with their stop aperture diameters being changed. For this reason, as illustrated in FIG. 6, even when the cam area 5c' for the first sub aperture stop unit 31 and the cam area 5d' for the second sub aperture stop unit 33 are provided in the single continuous cam groove portion, the first and second stop aperture diameters of the first and second sub aperture stop units 31 and 33 can be separately controlled.

Each of the above embodiments enables separately driving the stop blades of the first and second sub aperture stop units 31 and 33 without using an actuator. This configuration enables separately controlling the stop aperture diameters of the first and second sub aperture stop units 31 and 33 while suppressing an increase in number of parts and in cost. This configuration further enables controlling the stop aperture diameters of the first and second sub aperture stop units 31 and 33 within mutually different ranges, which can provide optimum stop aperture diameters of the first and second sub aperture stop units 31 and 33 at each zoom position.

The configuration of the image capturing optical system and the configuration to move the lens units in the lens barrel which were described in this embodiment are merely examples, and therefore other configurations may be employed.

Furthermore, although this embodiment described the lens barrel used for the interchangeable lens, alternative embodiments of the present invention include a lens barrel used for a lens-integrated image capturing apparatus (optical apparatus) provided with an image sensor (a CMOS sensor or a CCD sensor) that receives light from the lens barrel (main and sub aperture stop units).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-254692, filed on Dec. 17, 2014, which is hereby incorporated by reference herein in its entirety.

What is claimed is:

1. A lens barrel comprising:
   a main aperture stop;
   a first sub aperture stop including a first stop blade and a first driving member rotatable about an optical axis to drive the first stop blade in its open and close direction;
   a second sub aperture stop including a second stop blade and a second driving member rotatable about the optical axis to drive the second stop blade in its open and close direction; and
   a cam barrel including a first cam portion engaging with a first engagement portion provided to the first driving member and a second cam portion engaging with a second engagement portion provided to the second driving member, the first cam portion and the second cam portion having mutually different cam shapes, the cam barrel being rotatable about the optical axis to rotate the first and second driving members,
   wherein a first changeable range of a first stop aperture diameter of the first sub aperture stop and a second changeable range of a second stop aperture diameter of the second sub aperture stop are mutually different, and wherein the first stop aperture diameter and the second stop aperture diameter are mutually different at each zoom position from a wide-angle end to a telephoto end.

2. The lens barrel according to claim 1, wherein:

the first sub aperture stop is disposed on an object side in the optical axis direction further than the main aperture stop, and the second sub aperture stop is disposed on an image side in the optical axis direction further than the main aperture stop.

3. A lens barrel comprising:

a main aperture stop;

a first sub aperture stop including a first stop blade and a first driving member rotatable about an optical axis to drive the first stop blade in its open and close direction;

a second sub aperture stop including a second stop blade and a second driving member rotatable about the optical axis to drive the second stop blade in its open and close direction; and a cam barrel including a first cam portion engaging with a first engagement portion provided to the first driving member and a second cam portion engaging with a second engagement portion provided to the second driving member, the cam barrel being rotatable about the optical axis to rotate the first and second driving members, wherein the first and second cam portions included in the cam barrel are formed as a single continuous cam portion.

4. The lens barrel according to claim 1, wherein the first and second cam portions rotate the first and second driving members to mutually different rotation positions with respect to a same rotation position of the cam barrel.

5. The lens barrel according to claim 1, wherein the cam barrel is rotated about the optical axis in response to a zoom operation of the lens barrel.

6. The lens barrel according to claim 1, wherein:

the first sub aperture stop includes the first stop blade, the first driving member and a first base member to hold the first stop blade movably in the open and close direction and hold the first driving member rotatably, the second sub aperture stop includes the second stop blade, the second driving member and a second base member to hold the second stop blade movably in the open and close direction and hold the second driving member rotatably, and the first and second stop blades, the first and second driving members and the first and second base members are respectively mutually identical members.

7. The lens barrel according to claim 1, further comprising:

a first lens disposed on an object side further than the main aperture stop; and a second lens disposed on an image side further than the main aperture stop.

8. An optical apparatus comprising:

a lens barrel, wherein the lens barrel comprises:

a main aperture stop;

a first sub aperture stop including a first stop blade and a first driving member rotatable about an optical axis to drive the first stop blade in its open and close direction;

a second sub aperture stop including a second stop blade and a second driving member rotatable about the optical axis to drive the second stop blade in its open and close direction; and a cam barrel including a first cam portion engaging with a first engagement portion provided to the first driving member and a second cam portion engaging with a second engagement portion provided to the second driving member, the first cam portion and the second cam portion having mutually different cam shapes, the cam barrel being rotatable about the optical axis to rotate the first and second driving members, wherein a first changeable range of a first stop aperture diameter of the first sub aperture stop and a second changeable range of a second stop aperture diameter of the second sub aperture stop are mutually different, and wherein the first stop aperture diameter and the second stop aperture diameter are mutually different at each zoom position from a wide-angle end to a telephoto end.

9. The optical apparatus according to claim 8, further comprising an image sensor configured to receive light from the lens barrel.

10. The optical apparatus according to claim 8, further comprising an image sensor to which light through the main aperture stop is introduced.

11. The lens barrel according to claim 1, wherein:

the first changeable range of the first sub aperture stop is a changeable range provided when the first sub aperture stop is included in the lens barrel, and the second changeable range of the second sub aperture stop is a changeable range provided when the second sub aperture stop is included in the lens barrel.

12. The lens barrel according to claim 1, wherein:

the first changeable range of the first sub aperture stop and the second changeable range of the second sub aperture stop partially overlap with each other.

13. The lens barrel according to claim 1, wherein:

the first sub aperture stop and the second sub aperture stop are respectively mutually identical members.

14. An optical apparatus comprising:

a lens barrel, wherein the lens barrel comprises:

a main aperture stop;

a first sub aperture stop including a first stop blade and a first driving member rotatable about an optical axis to drive the first stop blade in its open and close direction;

a second sub aperture stop including a second stop blade and a second driving member rotatable about the optical axis to drive the second stop blade in its open and close direction; and a cam barrel including a first cam portion engaging with a first engagement portion provided to the first driving member and a second cam portion engaging with a second engagement portion provided to the second driving member, the cam barrel being rotatable about the optical axis to rotate the first and second driving members, wherein the first and second cam portions included in the cam barrel are formed as a single continuous cam portion.

* * * * *